United States Patent
Zhang et al.

(10) Patent No.: US 12,549,873 B2
(45) Date of Patent: Feb. 10, 2026

(54) PORT MODE SWITCHING METHOD, ELECTRONIC DEVICE, AND STORAGE MEDIUM

(71) Applicant: Ruijie Networks Co., Ltd., Fuzhou (CN)

(72) Inventors: Xiaofeng Zhang, Fujian (CN); Longshun Wang, Fujian (CN); Jiabin Liao, Fujian (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 0 days.

(21) Appl. No.: 19/230,229

(22) Filed: Jun. 6, 2025

(65) Prior Publication Data

US 2025/0301245 A1    Sep. 25, 2025

Related U.S. Application Data

(63) Continuation of application No. PCT/CN2024/100163, filed on Jun. 19, 2024.

(30) Foreign Application Priority Data

Dec. 6, 2023    (CN) ......................... 202311665913.0

(51) Int. Cl.
    *H04Q 11/00*    (2006.01)
(52) U.S. Cl.
    CPC ..... *H04Q 11/0005* (2013.01); *H04Q 11/0067* (2013.01); *H04Q 2011/0037* (2013.01)
(58) Field of Classification Search
    CPC ........... H04Q 11/0005; H04Q 11/0067; H04Q 2011/0037

USPC .......................................................... 398/45
See application file for complete search history.

(56) References Cited

U.S. PATENT DOCUMENTS

| | | | | |
|---|---|---|---|---|
| 10,148,385 | B2 * | 12/2018 | Yang | ................. H04J 14/0282 |
| 2012/0045199 | A1 | 2/2012 | Sun et al. | |

FOREIGN PATENT DOCUMENTS

| | | | | |
|---|---|---|---|---|
| CN | 107529100 A | * | 12/2017 | ......... H04L 41/0886 |
| CN | 109698981 A | | 4/2019 | |
| CN | 111541629 A | | 8/2020 | |
| CN | 114745619 A | | 7/2022 | |

OTHER PUBLICATIONS

International Search Report received for PCT Patent Application No. PCT/CN2024/100163, mailed on Sep. 20, 2024, 3 pages of Original Document only.

* cited by examiner

*Primary Examiner* — Dalzid E Singh
(74) *Attorney, Agent, or Firm* — ArentFox Schiff LLP; Michael Fainberg

(57) ABSTRACT

The present application discloses a port mode switching method, an apparatus, an electronic device, and a storage medium, where the method includes: when determining that a target port mode corresponding to a module type is different from a current port mode, switching a port from the current port mode to the target port mode according to a port mode switching manner set corresponding to the module type, wherein the port mode comprises a passive optical network PON mode and an Ethernet mode.

17 Claims, 7 Drawing Sheets

```
Respond to an operation of inserting an optical module into a port,       S401
acquiring characteristic information of the optical module Determine a module type of the optical module based on a plurality of     S402
optical module characteristics included in the characteristic information When determining that a target port mode corresponding to the module      S403
type is different from a current port mode, switch the port from the current
port mode to the target port mode according to a port mode switching
manner set corresponding to the module type
```

PORT MODE SWITCHING METHOD, ELECTRONIC DEVICE, AND STORAGE MEDIUM

CROSS-REFERENCE TO RELATED APPLICATIONS

This application is a continuation of International Application No. PCT/CN2024/100163, filed on Jun. 19, 2024, claims priority to Chinese Patent Application No. 202311665913.0, filed with the China National Intellectual Property Administration on Dec. 6, 2023 and entitled "PORT MODE SWITCHING METHOD, APPARATUS, ELECTRONIC DEVICE, AND STORAGE MEDIUM", which are incorporated herein by reference in their entireties.

TECHNICAL FIELD

The present application relates to the field of communication technology, and more particularly, to a port mode switching method, an electronic device, and a storage medium.

BACKGROUND

A passive optical network (Passive Optical Network, PON) supports a point-to-multipoint connection, which, compared to the point-to-point connection of an Ethernet (Ethernet), saves port resources and optical module resources, simplifies the network architecture, and replaces active aggregation devices with passive splitters, thereby reducing maintenance costs and power consumption.

However, the uplink of a PON involves multiple access nodes sharing bandwidth through time-division multiplexing, resulting in higher latency and lower uplink bandwidth compared to the point-to-point connection of an Ethernet.

Based on the respective advantages and disadvantages of PON and Ethernet, to meet the network demands of different users within the same network, it is necessary to integrate PON and Ethernet.

In related technologies, the integration and deployment of PON and Ethernet generally fall into two categories:
1. Deploying a PON as the backbone network, installing optical line terminal (Optical Line Terminal, OLT) devices at a central office or data center, and transmitting signals to user terminals via optical fibers, while deploying an Ethernet at the user terminals to provide local area network connectivity and internal communication.
2. Deploying an Ethernet as the backbone network, with Ethernet switches and network devices installed at a central office or data center, and connecting OLT devices to the backbone network, thereby enabling the OLT devices to connect to multiple optical network unit (Optical Network Unit, ONU) devices via an optical distribution network (Optical Distribution Network, ODN).

SUMMARY

Embodiments of the present application provide a port mode switching method, an electronic device, and a storage medium, enabling the use of a single network device port in an integrated PON and Ethernet network to meet user network demands for both PON and Ethernet through networking devices.

According to a first aspect, an embodiment of the present application provides a port mode switching method applied to an Ethernet device in an Ethernet networking, where the method includes:
 responding to an operation of inserting an optical module into a port, acquiring characteristic information of the optical module, where the characteristic information includes a plurality of optical module characteristics;
 determining a module type of the optical module based on the plurality of optical module characteristics; and
 when determining that a target port mode corresponding to the module type is different from a current port mode, switching the port from the current port mode to the target port mode according to a port mode switching manner set corresponding to the module type.

Through the switching method, a single network device port may be reused to simultaneously meet user network demands for PON and Ethernet, reducing the complexity and maintenance and management difficulty of the integrated network.

In a possible embodiment, the plurality of optical module characteristics include a wavelength characteristic and/or an interface characteristic.

In a possible embodiment, the determining a module type of the optical module based on the plurality of optical module characteristics includes: the Ethernet device determining a wavelength type corresponding to the optical module based on the acquired wavelength characteristic, and determining an interface type corresponding to the optical module based on the acquired interface characteristic; and determining the module type of the optical module based on the wavelength type and the interface type.

In a possible embodiment, the determining a module type of the optical module based on the plurality of optical module characteristics includes: the Ethernet device determining a wavelength characteristic interval to which the wavelength characteristic belongs, and an interface characteristic interval to which the interface characteristic belongs; and the Ethernet device determining the module type of the optical module based on the wavelength characteristic interval and the interface characteristic interval.

In a possible embodiment, the Ethernet device determining the module type of the optical module based on the wavelength characteristic interval and the interface characteristic interval includes: the Ethernet device determining a wavelength type and an interface type corresponding to the optical module based on the wavelength characteristic interval and the interface characteristic interval, and determining the module type of the optical module based on the wavelength type and the interface type.

In a possible embodiment, the Ethernet device acquires the characteristic information based on data acquisition devices respectively set corresponding to the plurality of optical module characteristics.

In a possible embodiment, the port mode includes a passive optical network PON mode and an Ethernet mode.

In an optional embodiment, if a following condition is met, it is determined that the target port mode corresponding to the module type is different from the current port mode:
 the target port mode is the passive optical network PON mode, and the current port mode is the Ethernet mode; or,
 the target port mode is the Ethernet mode, and the current port mode is the PON mode.

In the above embodiment, when the Ethernet device determines that the target port mode corresponding to the module type is different from the current port mode, a port mode switching operation may be triggered, switching the port from the current port mode to the target port mode, thereby providing network service capabilities corresponding to the target port mode.

In an optional embodiment, the module type includes a passive optical PON type and an Ethernet type.

In an optional embodiment, the switching the port from the current port mode to the target port mode according to a port mode switching manner set corresponding to the module type includes:
  if the module type is the PON type, switching the port from the Ethernet mode to the PON mode according to a port switching mode set corresponding to the PON type; and
  if the module type is the Ethernet type, switching the port from the PON mode to the Ethernet mode according to a port switching mode set corresponding to the Ethernet type.

In the above embodiment, the port switching modes set respectively corresponding to the PON optical module and the Ethernet optical module ensure that when an optical module is inserted and the target port mode is different from the current port mode, the port mode of the Ethernet device may be flexibly switched.

In an optional embodiment, the switching the port from the Ethernet mode to the PON mode according to a port switching mode set corresponding to the PON type includes:
  disabling an auto-negotiation capability of the port, and switching a communication state of the port to a forced connected state; where the forced connected state indicates: the port has a capability to actively send packets; and
  enabling a capability of the port to forward multipoint control protocol MPCP packets to a central processing unit CPU.

In the above embodiment, once the Ethernet network device detects that the inserted optical module is a PON-type optical module and the current port mode of the Ethernet network device is the Ethernet mode, the port mode of the port may be quickly switched from the Ethernet mode to the PON mode.

In an optional embodiment, after the enabling a capability of the port to forward multipoint control protocol MPCP packets to a central processing unit CPU, the method further includes:
  enabling a capability of the port to send MPCP packets, sending an access probe request for an integrated network; where the integrated network has a PON service capability and an Ethernet service capability;
  receiving access registration responses respectively returned by a plurality of to-be-accessed network devices based on the access probe request; and
  if there exists an access registration response indicating a need to access the integrated network among the plurality of access registration responses, performing access registration for the integrated network for a to-be-accessed network device corresponding to the access registration response.

In the above embodiment, after enabling the capability of the port to send MPCP packets, by actively sending the access probe request for the integrated network to the plurality of to-be-accessed network devices, the efficiency of access registration for the integrated network for the to-be-accessed network devices needing to access the integrated network can be greatly improved.

In an optional embodiment, the switching the port from the PON mode to the Ethernet mode according to a port switching mode set corresponding to the Ethernet type includes:
  disabling a capability of the port to receive MPCP packets;
  disabling a capability of the port to send MPCP packets; and
  switching a communication state of the port from a forced connected state to a disconnected state.

In the above embodiment, once the Ethernet device detects that the inserted optical module is an Ethernet-type optical module and the current port mode of the Ethernet device is the PON mode, the port mode of the port may be quickly switched from the PON mode to the Ethernet mode.

In an optional embodiment, the disabling a capability of the port to receive MPCP packets further includes:
  disabling a capability of the port to upload MPCP packets to a CPU.

In the above embodiment, by disabling the capability of the port to upload MPCP packets to the CPU while disabling the capability of the port to receive MPCP packets, energy consumption caused by continuously enabling the capability of the port to upload MPCP packets to the CPU can be reduced to some extent.

In an optional embodiment, after the switching a communication state of the port from a forced connected state to a disconnected state, the method further includes:
  enabling an auto-negotiation capability of the port, and when determining that the port receives an auto-negotiation signal, switching the communication state of the port from the disconnected state to a connected state; where the connected state indicates: the port has a capability to respond to packets but does not have a capability to actively send packets.

In the above embodiment, by enabling the auto-negotiation capability of the port and switching the communication state of the port to the connected state, it can be ensured that the Ethernet device and its port operate in the Ethernet working mode.

According to a second aspect, the present application further provides a port mode switching apparatus applied to any one Ethernet device in an Ethernet networking, where the apparatus includes:
  an information acquisition module configured to, responding to an operation of inserting an optical module into a port, acquire characteristic information of the optical module;
  a type determination module configured to determine a module type of the optical module based on the plurality of optical module characteristics included in the characteristic information; and
  a mode switching module configured to, when determining that a target port mode corresponding to the module type is different from a current port mode, switch the port from the current port mode to the target port mode according to a port mode switching manner set corresponding to the module type.

In an optional embodiment, the information acquisition module is specifically configured to acquire the characteristic information based on data acquisition devices respectively set corresponding to the plurality of optical module characteristics.

In an optional embodiment, the plurality of optical module characteristics include a wavelength characteristic and/or an interface characteristic.

In an optional embodiment, if a following condition is met, it is determined that the target port mode corresponding to the module type is different from the current port mode:

the target port mode is the passive optical network PON mode, and the current port mode is the Ethernet mode; or, the target port mode is the Ethernet mode, and the current port mode is the PON mode.

In an optional embodiment, when switching the port from the current port mode to the target port mode according to a port mode switching manner set corresponding to the module type, the mode switching module is specifically configured to:

if the module type is the PON type, switch the port from the Ethernet mode to the PON mode according to a port switching mode set corresponding to the PON type; and if the module type is the Ethernet type, switch the port from the PON mode to the Ethernet mode according to a port switching mode set corresponding to the Ethernet type.

In an optional embodiment, when switching the port from the Ethernet mode to the PON mode according to a port switching mode set corresponding to the PON type, the mode switching module is specifically configured to:

disable an auto-negotiation capability of the port, and switch a communication state of the port to a forced connected state; where the forced connected state indicates: the port has a capability to actively send packets;

enable a capability of the port to forward multipoint control protocol MPCP packets to a central processing unit CPU.

In an optional embodiment, after the enabling a capability of the port to forward multipoint control protocol MPCP packets to a central processing unit CPU, the mode switching module is further configured to:

enable a capability of the port to send MPCP packets, sending an access probe request for an integrated network; where the integrated network has a PON service capability and an Ethernet service capability;

receive access registration responses respectively returned by a plurality of to-be-accessed network devices based on the access probe request; and if there exists an access registration response indicating a need to access the integrated network among the plurality of access registration responses, perform access registration for the integrated network for a to-be-accessed network device corresponding to the access registration response.

In an optional embodiment, when switching the port from the PON mode to the Ethernet mode according to a port switching mode set corresponding to the Ethernet type, the mode switching module is specifically configured to:

disable a capability of the port to receive MPCP packets;
disable a capability of the port to send MPCP packets;
switch a communication state of the port from a forced connected state to a disconnected state.

In an optional embodiment, when disabling a capability of the port to receive MPCP packets, the mode switching module is further configured to:

disable a capability of the port to upload MPCP packets to a CPU.

In an optional embodiment, after the switching a communication state of the port from a forced connected state to a disconnected state, the mode switching module is further configured to:

enable an auto-negotiation capability of the port, and when determining that the port receives an auto-negotiation signal, switch the communication state of the port from the disconnected state to a connected state; where the connected state indicates: the port has a capability to respond to packets but does not have a capability to actively send packets.

According to a third aspect, the present application provides an electronic device including a processor and a memory, where the memory stores program code, and when the program code is executed by the processor, the processor performs steps of the port mode switching method described in the first aspect.

According to a fourth aspect, the present application provides a computer-readable storage medium including program code, where when the program code runs on an electronic device, the program code causes the electronic device to perform steps of the port mode switching method described in the first aspect.

According to a fifth aspect, the present application provides a computer program product, where when the computer program product is invoked by a computer, the computer performs steps of the port mode switching method described in the first aspect.

According to a sixth aspect, the present application provides a communication system including: an Ethernet device and a first to-be-accessed network device; where the Ethernet device is configured to, responding to an operation of inserting an optical module into a port, acquire characteristic information of the optical module, determine a module type of the optical module based on a plurality of optical module characteristics included in the characteristic information, and when determining that a target port mode corresponding to the module type is different from a current port mode, switch the port from the current port mode to the target port mode according to a port mode switching manner set corresponding to the module type, and send an access probe request for an integrated network to the first to-be-accessed network device; where the integrated network has a PON service capability and an Ethernet service capability; and the first to-be-accessed network device is configured to receive the access probe request, and when determining that the target port mode is a PON mode, return an access registration response to the Ethernet device based on the access probe request; where the access registration response indicates whether the first to-be-accessed network device needs to access the integrated network.

According to a seventh aspect, the present application provides a communication system including: an Ethernet device and a second to-be-accessed network device; where the Ethernet device is configured to, responding to an operation of inserting an optical module into a port, acquire characteristic information of the optical module, determine a module type of the optical module based on a plurality of optical module characteristics included in the characteristic information, and when determining that a target port mode corresponding to the module type is different from a current port mode, switch the port from the current port mode to the target port mode according to a port mode switching manner set corresponding to the module type, and send an access probe request for an integrated network to the second to-be-accessed network device; where the integrated network has a PON service capability and an Ethernet service capability; and the second to-be-accessed network device is configured to receive the access probe request, and when determining that the target port mode is an Ethernet mode, return an access registration response to the Ethernet device based on the access probe request; where the access registration response indicates whether the second to-be-accessed network device needs to access the integrated network.

According to an eighth aspect, the present application provides a communication system including: an Ethernet device and a third to-be-accessed network device; where the Ethernet device is configured to, responding to an operation of inserting an optical module into a port, acquire characteristic information of the optical module, determine a module type of the optical module based on a plurality of optical module characteristics included in the characteristic information, and when determining that a target port mode corresponding to the module type is different from a current port mode, switch the port from the current port mode to the target port mode according to a port mode switching manner set corresponding to the module type, and send an access probe request for an integrated network to the third to-be-accessed network device; where the integrated network has a PON service capability and an Ethernet service capability; and the third to-be-accessed network device is configured to receive the access probe request, and when determining that the target port mode is an Ethernet mode or a PON mode and the target port mode is the same as a device port mode of the third to-be-accessed network device, return an access registration response to the Ethernet device based on the access probe request; or, when determining that the target port mode is the Ethernet mode or the PON mode and the target port mode is different from the device port mode of the third to-be-accessed network device, switch the device port mode to the target port mode, and after switching the device port mode to the target port mode, return an access registration response to the Ethernet device based on the access probe request; where the access registration response indicates whether the third to-be-accessed network device needs to access the integrated network.

Beneficial effects of the present application are as follows:

In the port mode switching method provided by the present application, when determining that a target port mode corresponding to a module type of an inserted optical module is different from a current port mode, the port is switched from the current port mode to the target port mode according to a port mode switching manner set corresponding to the module type; in this way, the port mode of an Ethernet device may flexibly and automatically switch between port modes (such as the PON mode and the Ethernet mode), addressing the issue in PON and Ethernet convergence solutions that requires managing two different types of networking devices, making the integrated network easier to maintain; moreover, due to the free switching between multiple port modes, a single network device port may be used in the integrated PON and Ethernet network to meet user network demands for both PON and Ethernet through networking devices, further reducing the network complexity and the maintenance and management difficulty of the integrated network.

In addition, other features and advantages of the present application will be set forth in the following description, and some will become apparent from the description or be understood through the implementation of the present application. The objectives and other advantages of the present application can be achieved and obtained through the structures particularly pointed out in the written description, claims, and drawings.

BRIEF DESCRIPTION OF DRAWINGS

To more clearly illustrate the technical solutions in the embodiments of the present application, the drawings required for the description of the embodiments are briefly introduced below. It is apparent that the drawings described below are only some embodiments of the present application, and those skilled in the art can obtain other drawings based on these drawings without creative efforts. In the drawings.

DESCRIPTION OF EMBODIMENTS

Figure 1:
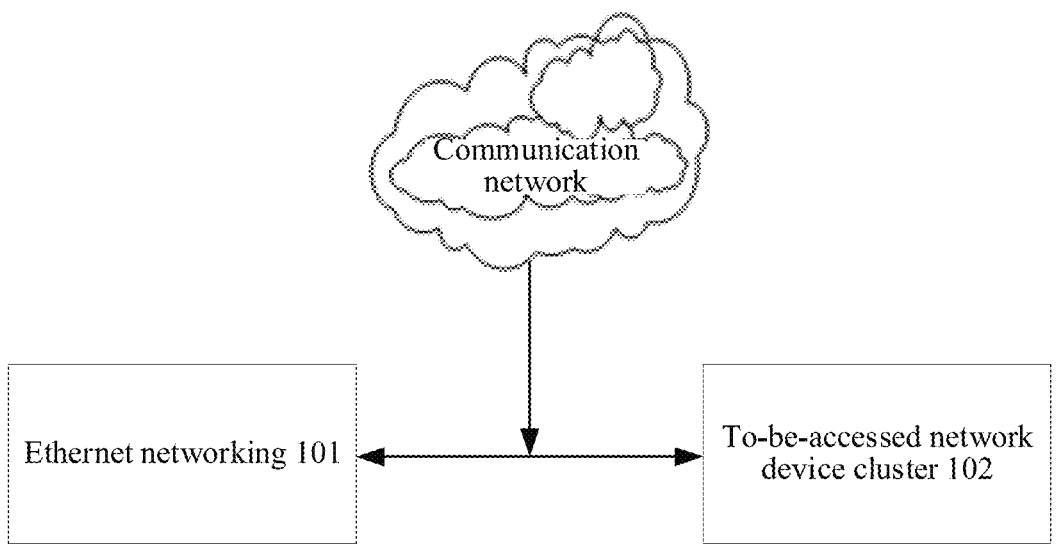
FIG. 1 is a schematic diagram of an optional system architecture applicable to an embodiment of the present application.

To make the objectives, technical solutions, and advantages of the embodiments of the present application clearer, the technical solutions of the present application will be described clearly and thoroughly below in conjunction with the drawings in the embodiments of the present application. It is apparent that the described embodiments are only a part of the embodiments of the present application, not all embodiments. Based on the embodiments described in the present application, all other embodiments obtained by those skilled in the art without creative efforts fall within the scope of protection of the technical solutions of the present application.

It should be noted that in the description of the present application, "a plurality" is understood as "at least two." "And/or" describes an association relationship of associated objects, indicating that three relationships may exist, for example, A and/or B may indicate: A exists alone, A and B exist simultaneously, and B exists alone. A connection between A and B may indicate: A is directly connected to B, and A is connected to B through C. In addition, in the description of the present application, terms such as "first" and "second" are used only for distinguishing descriptions and should not be understood as indicating or implying relative importance or indicating or implying an order.

It should be understood that although the steps in the flowcharts of the present application are shown sequentially as indicated by arrows, these steps are not necessarily performed in the order indicated by the arrows. Unless explicitly stated herein, there is no strict order restriction for the execution of these steps, and they may be performed in other orders. Moreover, at least some of the steps in the flowcharts may include multiple sub-steps or multiple stages, which are not necessarily performed at the same time but may be performed at different times, and their execution order is not necessarily sequential but may be performed alternately or in rotation with other steps or at least a portion of sub-steps or stages of other steps.

In addition, in the technical solutions of the present application, the collection, dissemination, and use of data comply with the requirements of relevant national laws and regulations.

The following explains some technical terms used in the embodiments of the present application to facilitate understanding by those skilled in the art.
  (1) Multipoint control protocol (Multi-Point Control Protocol, MPCP): a protocol at the media access control (Media Access Control, MAC) sublayer in an Ethernet passive optical network (Ethernet Passive Optical Network, EPON).

It should be noted that MPCP also defines a control mechanism between an OLT and an ONU, which may coordinate the effective sending and receiving of data/packets.
  (2) EPON: a PON technology based on Ethernet, adopting a point-to-multipoint structure and passive optical fiber transmission, capable of providing services over Ethernet.

Further, based on the above terms and related explanations, the design concept of the embodiments of the present application is briefly introduced below:

Currently, PON, due to its high-speed and high-bandwidth transmission capabilities and ability to provide stable and reliable network connections for users, is suitable for large-scale data transmission and multimedia applications; for example, PON is widely used in fields such as broadband access, campus networks, and urban broadband coverage.

Ethernet, due to its mature standards and device ecosystem, ease of deployment and maintenance, is also widely used in daily life, particularly in local area network (Local Area Network, LAN) environments; for example, Ethernet is suitable for scenarios such as office networks, home networks, and data centers.

Although PON technology supports a point-to-multipoint connection, compared to the point-to-point connection of Ethernet, it saves port resources and optical module resources, simplifies the network architecture, and may replace active aggregation devices with passive splitters, reducing maintenance costs and power consumption.

However, the uplink of PON involves multiple access nodes sharing bandwidth through time-division multiplexing, resulting in higher latency and lower uplink bandwidth compared to the point-to-point connection of Ethernet; thus, it can be seen that PON and Ethernet each have advantages and disadvantages in different usage scenarios.

Further, based on the respective advantages and disadvantages of PON and Ethernet, to meet the network demands of different users within the same network, it is necessary to integrate PON and Ethernet.

It should be noted that since PON and Ethernet are based on different network packet encapsulations, integrating these two networks requires knowledge of both PON and Ethernet, making the deployment of such an integrated network require additional learning costs.

In related technologies, the integration and deployment of PON and Ethernet generally fall into two categories:
  1. Deploying a PON as the backbone network, installing OLT devices at a central office or data center, and transmitting signals to user terminals via optical fibers, while deploying an Ethernet at the user terminals to provide local area network connectivity and internal communication.
  2. Deploying an Ethernet as the backbone network, with Ethernet switches and network devices installed at a central office or data center, and connecting OLT devices to the backbone network, thereby enabling the OLT devices to connect to multiple ONU devices via an ODN.

However, both of the above deployment methods have the disadvantage of requiring two different types of networking devices within the same network, which not only increases network complexity but also significantly increases the difficulty of network maintenance and management; meanwhile, if network demands change, such as users requiring higher uplink bandwidth or lower network latency, the shared uplink implementation of PON becomes unsuitable, leading to the deployed PON devices being replaced by Ethernet devices, resulting in ineffective investment.

Moreover, current port switching solutions for PON devices focus on switching between different PON interfaces, and port switching for Ethernet devices is limited to switching between different port rate capabilities such as 1G/10G, but none provide a solution for switching between different types of network device ports (Ethernet device ports and PON device ports) under the same network device port (such as an Ethernet device port).

In view of this, if there exists a networking device port that can operate in both Ethernet mode and PON mode and can automatically switch between the two port (working) modes, it not only addresses the issue in PON and Ethernet convergence solutions that requires managing two different types of networking devices, making the network easier to maintain; it also, due to the free switching between the two modes, makes network deployment more flexible, and the investment in networking devices more scalable and flexible, effectively protecting the investment in networking devices.

Therefore, an embodiment of the present application proposes a port mode switching method applied to any one Ethernet network device in an Ethernet networking, specifically including: responding to an operation of inserting an optical module into a port, acquiring characteristic information of the optical module; then, determining a module type of the optical module based on a plurality of optical module characteristics included in the characteristic information; and when determining that a target port mode corresponding to the module type is different from a current port mode, switching the port from the current port mode to the target port mode according to a port mode switching manner set corresponding to the module type, so as to use a single network device port in an integrated PON and Ethernet network to meet user network demands for both PON and Ethernet through networking devices.

It should be noted that in embodiments of the present application, the target port mode being the PON mode indicates: an operating state of a port of an Ethernet device in the PON mode; similarly, the target port mode being the Ethernet mode indicates: an operating state of a port of an Ethernet device in the Ethernet mode.

For example, the operating state of a port of an Ethernet device in the PON mode includes but is not limited to: the port does not have an auto-negotiation capability, the communication state of the port is a forced connected state, the port has a capability to receive and forward MPCP packets to a central processing unit (Central Processing Unit, CPU), and the port has a capability to send MPCP packets; the operating state of a port of an Ethernet device in the Ethernet mode includes but is not limited to: the port has an auto-negotiation capability, the communication state of the port is a disconnected state or a connected state, the port does not have a capability to receive and forward MPCP packets to the CPU, and the port does not have a capability to send MPCP packets; where the forced connected state indicates: the port has a capability to respond to packets and a capability to actively send packets, and the connected state indicates: the port has a capability to respond to packets but does not have a capability to actively send packets.

In particular, preferred embodiments of the present application are described below in conjunction with the accompanying drawings. It should be understood that the preferred embodiments described herein are only used to illustrate and explain the present application and are not used to limit the present application, and in the absence of conflict, the embodiments and features in the embodiments of the present application may be combined with each other.

Referring to FIG. 1, a schematic diagram of an optional system architecture applicable to an embodiment of the present application is shown, the system including: an Ethernet networking 101 and a to-be-accessed network device cluster 102. Information interaction may be performed between the Ethernet networking 101 and the to-be-accessed network device cluster 102 through a communication network, where the communication method adopted by the communication network may include: a wireless communication method and a wired communication method.

For example, the Ethernet networking 101 may access a network through cellular mobile communication technology to communicate with the to-be-accessed network device cluster 102, where the cellular mobile communication technology, for example, includes fifth generation mobile networks (5th Generation Mobile Networks, 5G) technology.

Optionally, the Ethernet networking 101 may access the network through a short-range wireless communication method to communicate with the to-be-accessed network device cluster 102, where the short-range wireless communication method, for example, includes wireless fidelity (Wireless Fidelity, Wi-Fi) technology.

Embodiments of the present application do not impose any restrictions on the number of communication devices involved in the above system architecture; for example, there may be more to-be-accessed network device clusters 102, or no to-be-accessed network device cluster 102, or other network devices may be included. As shown in FIG. 1, the description is made by taking the Ethernet networking 101 and the to-be-accessed network device cluster 102 as examples. The following briefly introduces the above devices and their respective functions.

In the Ethernet networking 101, each Ethernet device may provide network service capabilities corresponding to an integrated network for users; in particular, in the embodiments of the present application, the integrated network is obtained by converging a PON and an Ethernet, so the integrated network has a PON service capability and an Ethernet service capability.

The PON is a communication network architecture using optical fiber transmission technology, utilizing optical fibers as a transmission medium to transmit optical signals between users, capable of achieving high-speed data transmission and broadband access, mainly consisting of three parts, including an OLT, an ODN, and an ONU, with specific functions as follows:

the OLT is a core device of the PON, configured to send and receive optical signals, convert data into optical signals, and transmit them to user ends via optical fibers; the ODN is configured to transmit optical signals from the OLT to user ends, typically adopting a tree or star topology, transmitting signals to different user ends through optical fiber branching; the ONU is a user-end device configured to receive optical signals and convert them into electrical signals, providing network connectivity to user devices, such as computers, phones, routers, and the like.

The characteristics and working principles of the PON are: 1. Optical fiber sharing: multiple users may transmit through the same optical fiber, that is, a point-to-multipoint transmission technology, where downstream data is physically split in a passive splitter and transmitted to connected terminals simultaneously, and upstream data is separated by time-division multiplexing technology, slicing signals of different users in time to share the uplink bandwidth; 2. Passive optical fiber distribution: the optical fiber distribution in the PON is passive, using purely physical splitting technology, requiring no additional power or signal processing devices. This allows the aggregation layer network to use passive splitters instead, reducing power consumption and maintenance costs of intermediate link transmission; 3. Long-distance transmission: the PON uses optical fibers as a transmission medium, capable of achieving long-distance transmission, generally covering a range of tens of kilometers.

Ethernet is a common communication protocol and packet-switched network technology, typically widely used in a LAN to achieve transmission/interaction of related data.

The characteristics and working principles of Ethernet are: 1. Physical medium: Ethernet may use different physical media for data transmission, including but not limited to: copper cables (such as twisted pairs) and optical fibers, in particular, common Ethernet transmission rates include: 10 Mbps, 100 Mbps, 1 Gbps, and 10 Gbps, and the like; 2. Carrier sense multiple access with collision detection (Carrier Sense Multiple Access with Collision Detection, CSMA/CD) protocol: Ethernet uses the CSMA/CD protocol to control data transmission, allowing multiple devices to share the same physical medium and detect whether a channel is idle before sending data to avoid collisions; 3. Ethernet frame structure: Ethernet uses an Ethernet frame (Ethernet Frame) as a basic unit of data transmission, where the Ethernet frame includes fields such as a destination MAC address, a source MAC address, a data portion, and a checksum, used to identify and transmit data in the network; 4. MAC address: each device connected to an Ethernet has a unique MAC address used to identify the device in the network; 5. Network topology: Ethernet supports multiple topology structures, including but not limited to: bus, star, and ring, for example, Ethernet switches are widely used to build star-topology LANs.

Figure 2:
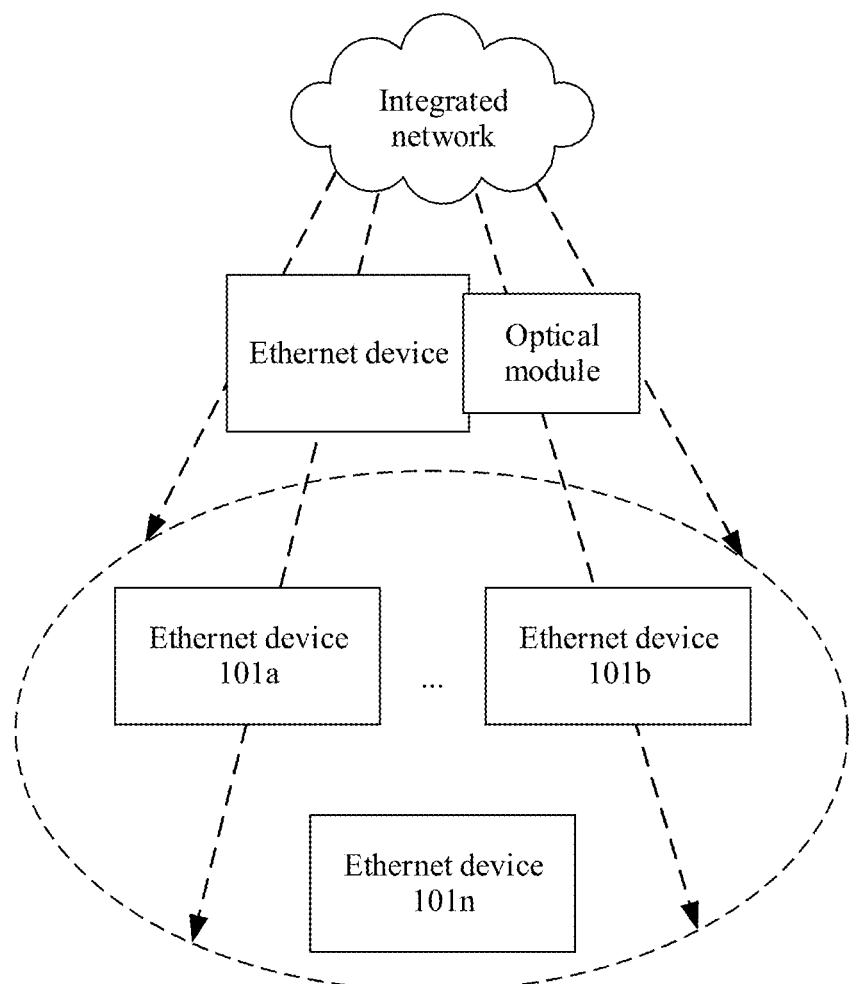
FIG. 2 is a schematic diagram of a composition structure of an Ethernet networking provided by an embodiment of the present application.

In addition, referring to FIG. 2, each Ethernet device (101a, 101b, . . . , 101n) in the Ethernet networking 101 may be configured to, responding to an operation of inserting an optical module into a port, acquire characteristic information of the optical module, and determine a module type of the optical module based on characteristic intervals to which a plurality of optical module characteristics included in the characteristic information respectively belong, so as to, when determining that a target port mode corresponding to the module type is different from a current port mode, switch the port from the current port mode to the target port mode according to a port mode switching manner set corresponding to the module type, thereby providing a network service capability (a PON service capability or an Ethernet service capability) matching the module type of the optical module. The network service capability corresponding to the PON mode is the PON service capability, and the network service capability corresponding to the Ethernet mode is the Ethernet service capability.

It should be noted that, as shown in FIG. 2, an optical module is one of the core components of network communication and may be inserted into any one Ethernet device in the Ethernet networking 101. Its main function is photoelectric conversion of signals, that is, a transmitting end converts electrical signals into optical signals, which are transmitted through optical fibers, and a receiving end converts the optical signals back into electrical signals; therefore, simply put, optical modules are used wherever optical fibers are used; in addition, in the embodiments of the present application, the optical module may be a PON optical module or an Ethernet optical module.

Figure 3:
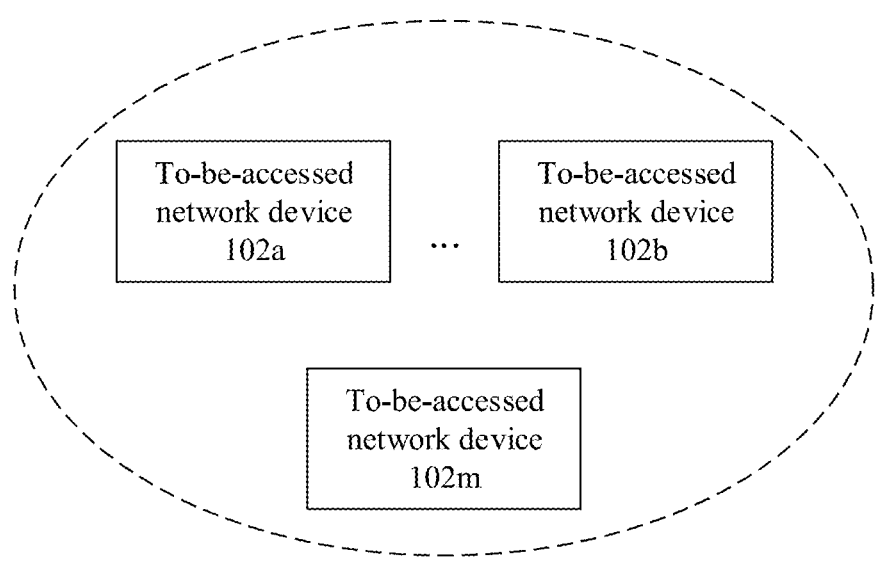
FIG. 3 is a schematic diagram of a composition structure of a to-be-accessed network device cluster provided by an embodiment of the present application.

The to-be-accessed network device cluster 102 includes: a plurality of to-be-accessed network devices (102a, 102b, . . . , and 102m). Referring to FIG. 3, in the embodiments of the present application, each to-be-accessed network device may be configured to receive an access probe request for an integrated network sent by a corresponding Ethernet device and return an access registration response based on the access probe request, where the access registration response indicates whether the corresponding to-be-accessed network device needs to access the integrated network, that is, whether access registration for the integrated network is needed for the corresponding to-be-accessed network device.

For example, the above to-be-accessed network device may specifically be: a user-end device with a single network mode (such as the PON mode or the Ethernet mode), a user-end device with dual modes (such as the PON mode and the Ethernet mode), or a user-end device with more modes. Therefore, the user-end device in the single network mode may be: an ONU device in the PON mode. Since a PON includes an ONU, the ONU device may also be referred to as a PON device.

When a to-be-accessed network device determines that a target port mode is the same as its own device port mode, there is no need to switch the port mode of its own port, that is, it only needs to maintain its own device port mode; conversely, when determining that the target port mode is different from its own device port mode, it needs to switch its own port mode to the target port mode, that is, switch the device port mode to the target port mode.

The port mode switching method provided by exemplary embodiments of the present application is described below in conjunction with the above system architecture and with reference to the drawings. It should be noted that the above system architecture is shown only to facilitate understanding of the spirit and principles of the present application, and the embodiments of the present application are not limited in this regard.

Figure 4:
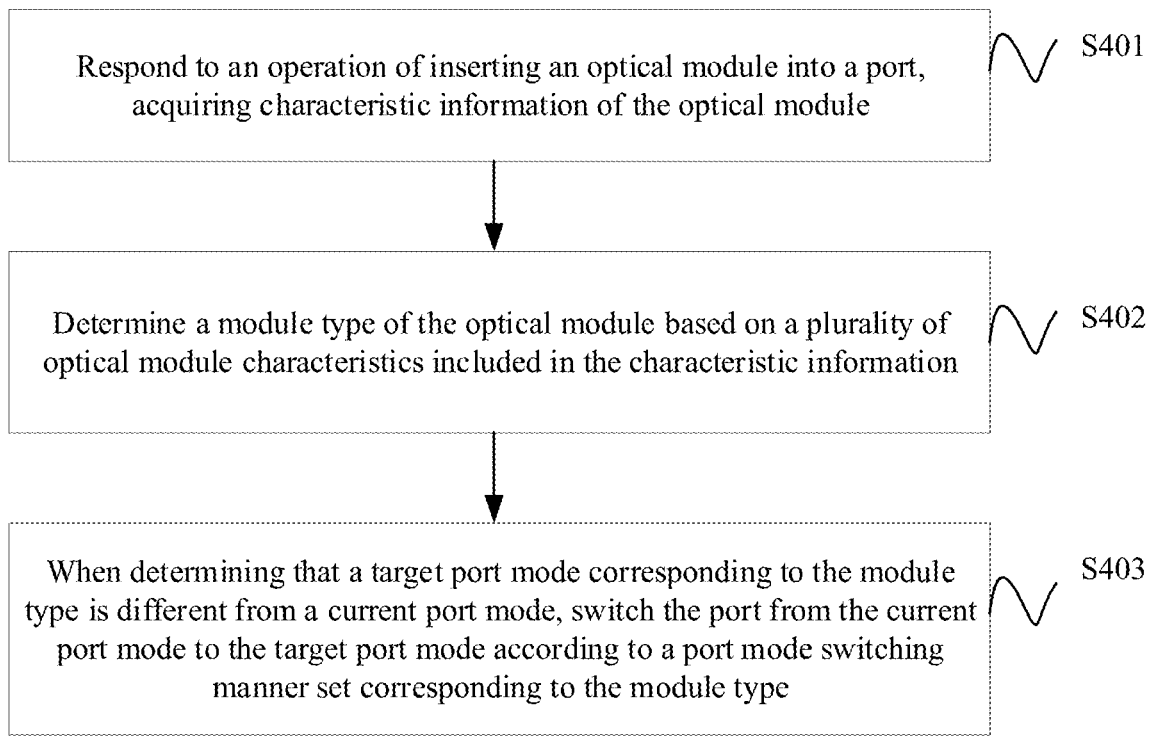
FIG. 4 is a schematic flowchart of an implementation of a port mode switching method provided by an embodiment of the present application.

Referring to FIG. 4, a schematic flowchart of an implementation of a port mode switching method provided by an embodiment of the present application is shown, with an execution subject being any one Ethernet device on a central office side in an Ethernet networking, for example, a first Ethernet device as the execution subject. The specific implementation process of the method is as follows:

Step S401: Responding to an operation of inserting an optical module into a port, acquire characteristic information of the optical module.

For example, when performing Step 401, the first Ethernet device detects an optical module insertion event according to a specified optical module insertion detection period (for example, 2 seconds). When detecting that a (network) port of the first Ethernet device has an optical module inserted, acquisition of the characteristic information of the optical module is triggered, that is, responding to the operation of inserting the optical module into the port, thereby acquiring the characteristic information.

It should be noted that the first Ethernet device may acquire the characteristic information based on data acquisition devices, such as sensors, respectively set corresponding to a plurality of optical module characteristics included in the characteristic information.

Step 402: Determine a module type of the optical module based on characteristic intervals to which a plurality of optical module characteristics included in the characteristic information respectively belong.

The above plurality of optical module characteristics include but is not limited to: a wavelength characteristic and/or an interface characteristic.

For example, when performing Step 402, assuming that the optical module characteristics included in the characteristic information are a wavelength characteristic and an interface characteristic, the first Ethernet device may determine a wavelength characteristic interval to which the wavelength characteristic belongs and an interface characteristic interval to which the interface characteristic belongs, thereby determining a wavelength type and an interface type corresponding to the optical module based on the acquired wavelength characteristic interval and interface characteristic interval, and further determining the module type of the optical module. Although the example is developed with the use of both the wavelength characteristic and the interface characteristic to determine the optical module type, the present application is not limited thereto. Embodiments that determine the optical module type using only one of the wavelength characteristic or the interface characteristic may be derived by analogy from the example logic, and these embodiments are still within the scope of protection of the present application.

Further, the first Ethernet device may determine a wavelength type and an interface type corresponding to the optical module based on the wavelength characteristic interval to which the wavelength characteristic belongs and the interface characteristic interval to which the interface characteristic belongs, thereby determining the module type of the optical module as a PON type or an Ethernet type. For example, a correspondence between the wavelength characteristic interval and the interface characteristic interval and the PON type and the Ethernet type is shown in Table 1:

TABLE 1

| Wavelength characteristic interval | Interface characteristic interval | Optical module type |
|---|---|---|
| Wave.Cha.Int.1 | In.Cha.Int.1 | PON type |
| Wave.Cha.Int.2 | In.Cha.Int.2 | Ethernet type |

In the table, Wave.Cha.Int represents a wavelength characteristic value, and In.Cha.Int represents an interface characteristic value.

Optionally, the first Ethernet device may directly determine a wavelength type corresponding to the optical module based on the acquired wavelength characteristic and determine an interface type corresponding to the optical module based on the acquired interface characteristic, thereby determining the module type of the optical module based on the wavelength type and the interface type corresponding to the optical module. For example, a correspondence between the wavelength type and the interface type and the PON type and the Ethernet type is shown in Table 2:

TABLE 2

| Wavelength type | Interface type | Optical module type |
|---|---|---|
| Wave.Type.1 | In.Type.1 | PON type |
| Wave.Type.2 | In.Type.2 | Ethernet type |

In this way, the first Ethernet device identifies the wavelength type and the interface type corresponding to the optical module by reading the characteristic information, distinguishing whether the optical module is a PON optical module or an Ethernet optical module, so as to subsequently switch a (network) port working mode based on the module type of the optical module.

Step 403: When determining that a target port mode corresponding to the module type is different from a current port mode, switch the port from the current port mode to the target port mode according to a port mode switching manner set corresponding to the module type.

Specifically, when performing Step 403, after determining the module type of the optical module, the first Ethernet device may determine whether the target port mode corresponding to the module type is consistent with the current port mode of the first Ethernet device/port.

In an optional implementation, if a following condition is met, it can be determined that the target port mode corresponding to the module type is different from the current port mode: the target port mode is the PON mode, and the current port mode is the Ethernet mode; or, the target port mode is the Ethernet mode, and the current port mode is the PON mode. In this way, when the first Ethernet device determines that the target port mode corresponding to the module type is different from the current port mode, a port mode switching operation may be triggered, switching the port from the current port mode to the target port mode, thereby providing network service capabilities corresponding to the target port mode.

It should be noted that since the execution entity is the first Ethernet device, the current port mode is typically the Ethernet mode, that is, the port of the first Ethernet device may default to the Ethernet mode. However, it can be understood that the port of the first Ethernet device may also default to other modes.

Further, when the first Ethernet device determines that the target port mode corresponding to the module type is different from the current port mode, the port may be switched from the current port mode to the target port mode according to the port mode switching manner set corresponding to the module type.

Figure 5:
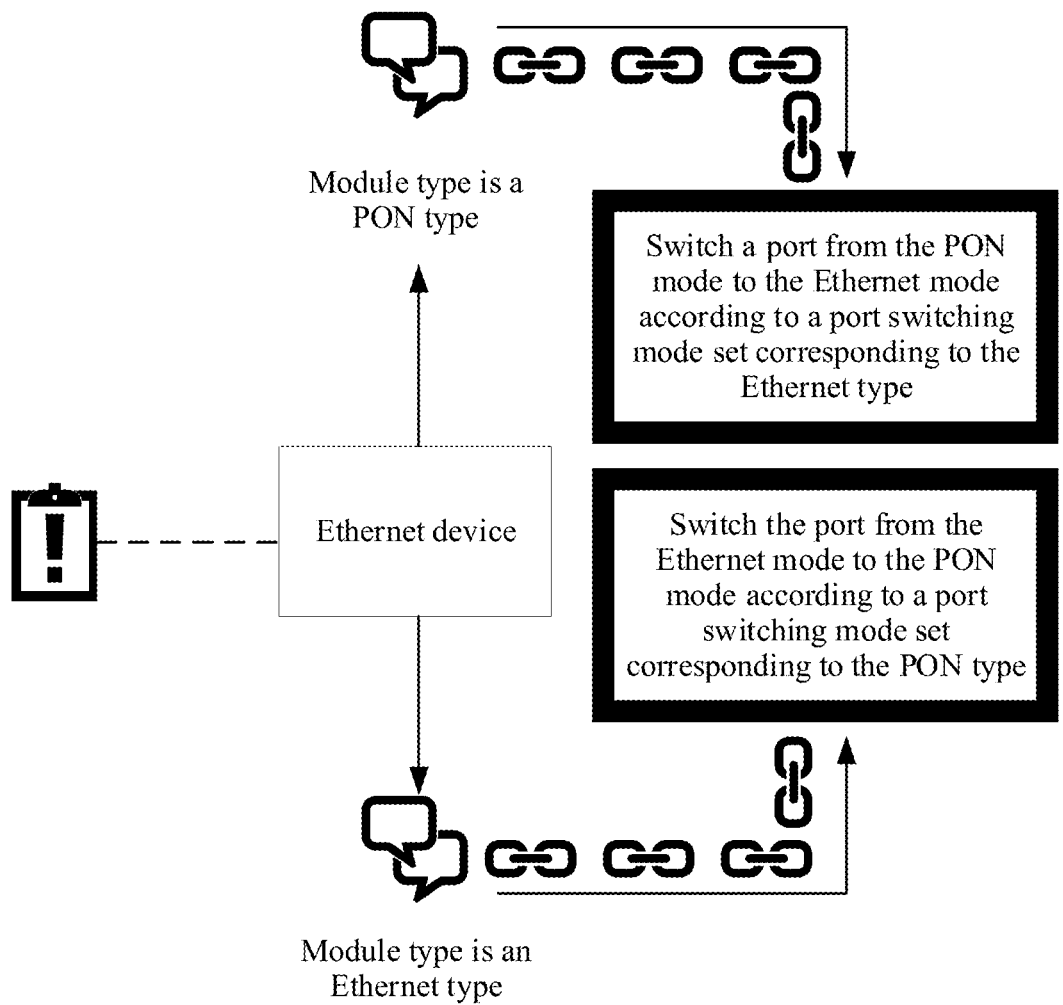
FIG. 5 is a schematic logic diagram of switching a port mode provided by an embodiment of the present application.

For example, the module type of the optical module may be a PON type or an Ethernet type. Referring to FIG. 5, if the module type is the PON type, the port is switched from the Ethernet mode to the PON mode according to a port switching mode set corresponding to the PON type; and if the module type is the Ethernet type, the port is switched from the PON mode to the Ethernet mode according to a port switching mode set corresponding to the Ethernet type. In this way, the port switching modes set respectively corresponding to the PON optical module and the Ethernet optical module ensure that when an optical module is inserted and the target port mode is different from the current port mode, the port mode of the first Ethernet device may be flexibly switched.

In an optional implementation, when the first Ethernet device switches the port mode of the port from the Ethernet mode to the PON mode according to the port switching mode set corresponding to the PON type, the following operations need to be performed:

1. Disable an auto-negotiation capability of the port, and switch a communication state of the port to a forced connected state, that is, a Force link up state.

The forced connected state indicates: the port has a capability to respond to packets and a capability to actively send packets.

For example, the content of auto-negotiation mainly includes: (half) duplex mode, operating rate, and flow control, and once auto-negotiation is passed, devices at both ends of a link will lock into this operating mode.

2. Enable a capability of the port to forward MPCP packets to a CPU.

It should be noted that since the integrated network is a network with both a PON service capability and an Ethernet service capability, MPCP needs to be used for switching the port from the Ethernet mode to the PON mode; moreover, since port mode switching pertains to data processing on a control plane, MPCP packets related to port mode switching need to be configured to be forwarded to the CPU.

For example, the first Ethernet device may receive packet information sent using MPCP by other Ethernet devices in the Ethernet networking and forward the received packet information to its own CPU to achieve interaction between MPCP packets.

Figure 6:
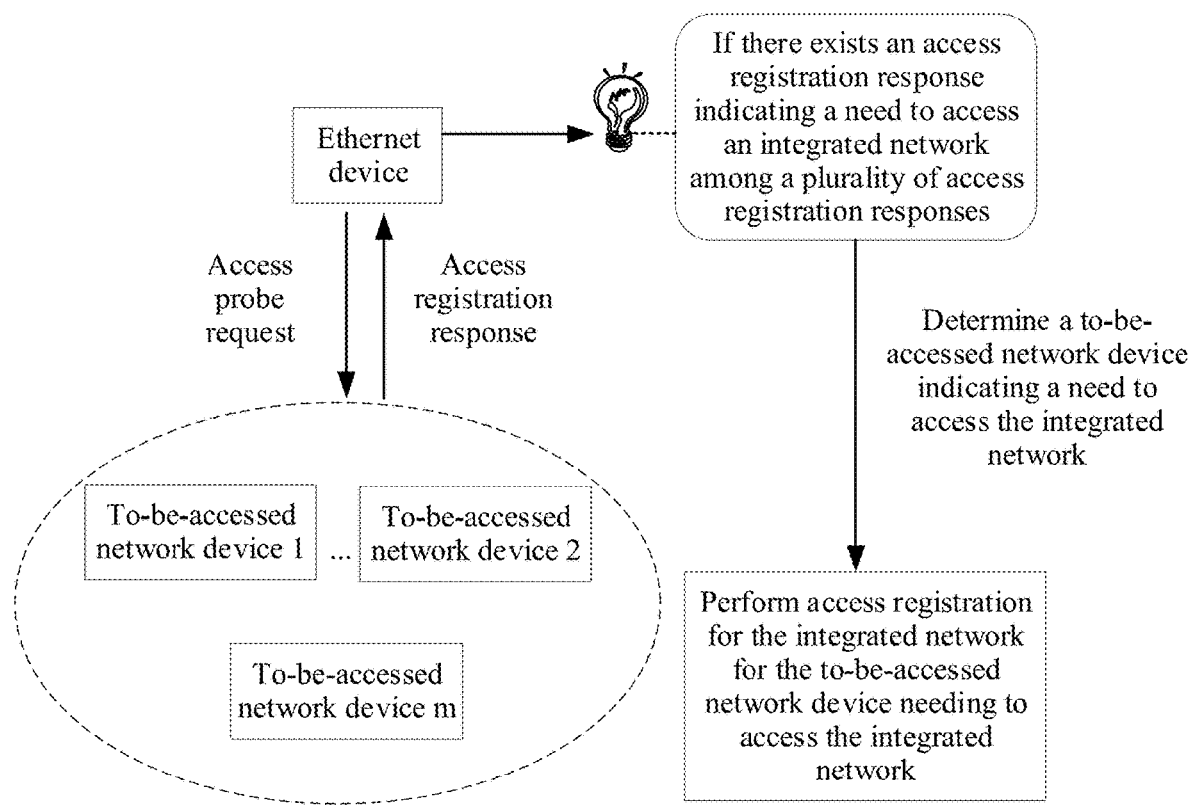
FIG. 6 is a schematic logic diagram of performing access registration for a to-be-accessed network device provided by an embodiment of the present application.

3. Enable a capability of the port to send MPCP packets, and referring to FIG. 6, send an access probe request for an integrated network, thereby receiving access registration responses respectively returned by a plurality of to-be-accessed network devices based on the access probe request. If there exists an access registration response indicating a need to access the integrated network among the plurality of access registration responses, perform access registration for the integrated network for the to-be-accessed network device corresponding to the access registration response; it should be noted that the access registration response may indicate a need for access registration for the integrated network for the corresponding to-be-accessed network device or no need for access registration for the integrated network for the corresponding to-be-accessed network device.

Obviously, based on the above manner, once the first Ethernet device detects that the inserted optical module is a PON-type optical module and the current port mode of the first Ethernet device is the Ethernet mode, the port mode of the port may be quickly switched from the Ethernet mode to the PON mode.

In an optional implementation, when the first Ethernet device switches the port mode of the port from the PON mode to the Ethernet mode according to the port switching mode set corresponding to the Ethernet type, the following operations need to be performed:

1. Disable a capability of the port to receive MPCP packets.

Specifically, after switching the port mode of the port from the PON mode to the Ethernet mode, the first Ethernet device no longer has the capability to receive MPCP packets.

In an optional implementation, when disabling the capability of the port to receive MPCP packets, the first Ethernet device also disables a capability of the port to upload MPCP packets to the CPU. In this way, energy consumption caused by the continuously enabled capability of the port to upload MPCP packets to the CPU can be reduced to some extent.

It should be noted that the first Ethernet device may disable the capability of the port to upload MPCP packets to the CPU after all unuploaded MPCP packets have been uploaded, or directly disable the capability of the port to upload MPCP packets to the CPU, that is, not performing an upload operation for unuploaded MPCP packets.

2. Disable a capability of the port to send MPCP packets.

Disabling the capability of the port to send MPCP packets means disabling MPCP, that is, not supporting MPCP.

3. Switch a communication state of the port from a forced connected state to a disconnected state, that is, a Link down state.

4. Enable an auto-negotiation capability of the port, and when determining that the port receives an auto-negotiation signal, switch the communication state of the port from the disconnected state to a connected state, that is, a Link up state.

The connected state indicates: the port has a capability to respond to packets but does not have a capability to actively send packets, that is, it needs to receive a signal before sending packets/signals.

It should be noted that receiving an auto-negotiation signal by the port represents: the port is in a normal auto-negotiation state.

Similarly, based on the above manner, once the first Ethernet device detects that the inserted optical module is an Ethernet-type optical module and the current port mode of the first Ethernet device is the PON mode, the port mode of the port may be quickly switched from the PON mode to the Ethernet mode.

Figure 7:
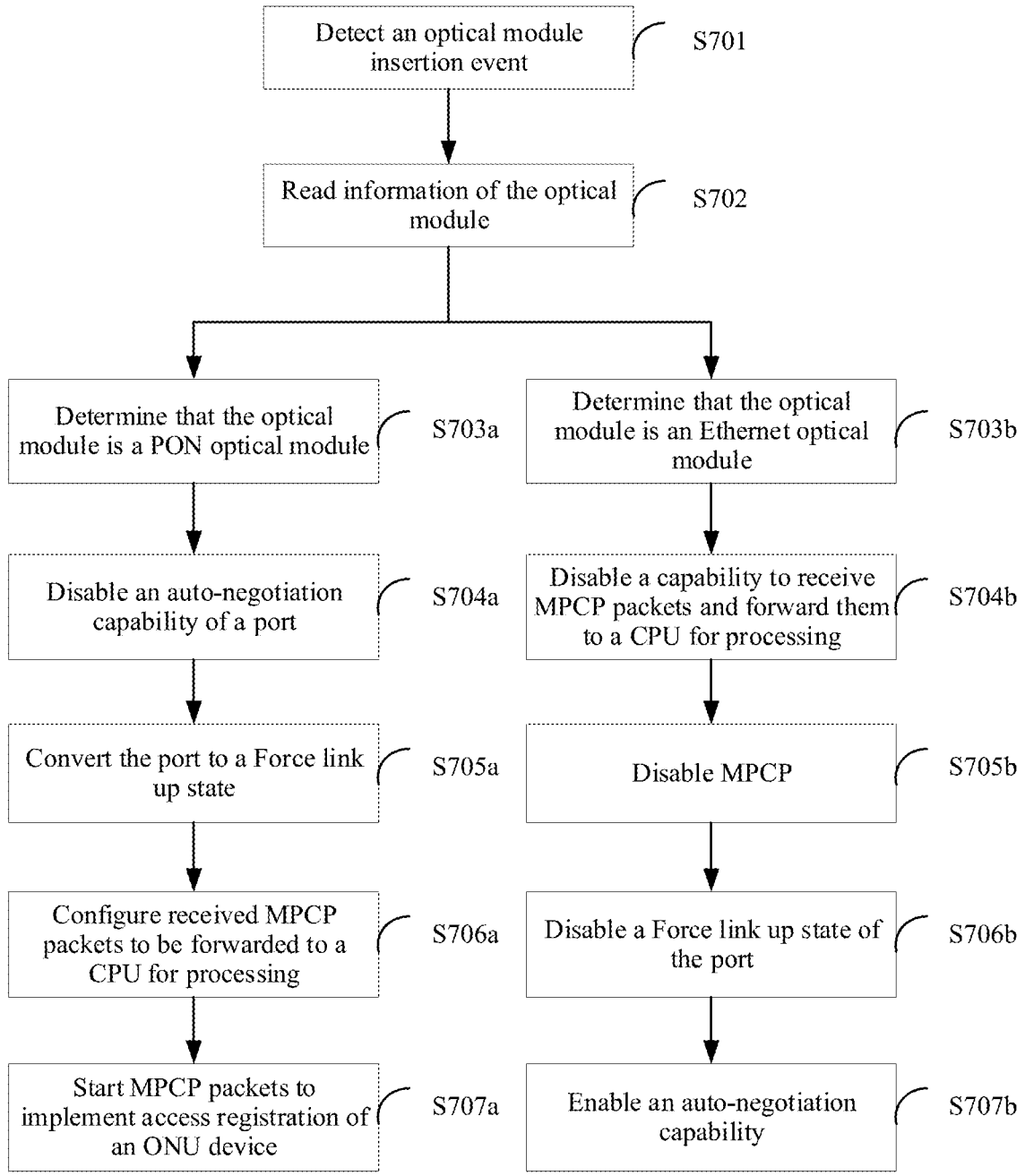
FIG. 7 is a schematic flowchart of a specific implementation based on FIG. 4 provided by an embodiment of the present application.

Based on the port mode switching method described in the above Steps 401 to 403, assuming the to-be-accessed network device is an ONU device, referring to FIG. 7, the first Ethernet device may perform the following specific method process:

Step 701: Detect an optical module insertion event.

Specifically, when performing Step 701, when the first Ethernet device detects that a port has an optical module inserted, acquisition of characteristic information is triggered.

Step 702: Read characteristic information.

Specifically, when performing Step 702, the first Ethernet device distinguishes whether the optical module is a PON module or an Ethernet optical module by identifying a wavelength type and an interface type of the optical module.

If it is determined that the optical module is a PON optical module, proceed to Step 703a, and perform the method process corresponding to Steps 704a to 707a for switching the port from the Ethernet mode to the PON mode.

If it is determined that the optical module is an Ethernet optical module, proceed to Step 703b, and perform the method process corresponding to Steps 704b to 707b for switching the port from the PON mode to the Ethernet mode.

It should be noted that the port mode of the first Ethernet device defaults to the Ethernet mode.

Step 703a: Determine that the optical module is a PON optical module.

Therefore, assuming the current port mode is the default mode, that is, the Ethernet mode, the steps to be performed for switching the port from the Ethernet mode to the PON mode, Steps 704a to 707a, are specifically as follows:

Step 704a: Disable an auto-negotiation capability of the port.

Step 705a: Convert the port to a Force link up state.

It should be noted that after the communication state of the port of the first Ethernet device is converted to the Force link up state, the first Ethernet device may actively send packets, that is, has a capability to actively send packets/signals.

Step 706a: Configure received MPCP packets to be forwarded to a CPU for processing.

In this way, interaction between MPCP packets related to port mode switching may be achieved.

Step 707a: Start MPCP packets to implement access registration of an ONU device.

Step 703b: Determine that the optical module is an Ethernet optical module.

Furthermore, assuming the current port mode is the PON mode, the steps to be performed for switching the port from the PON mode to the Ethernet mode, Steps 704b to 707b, are specifically as follows:

Step 704b: Disable a capability to receive MPCP packets and forward them to a CPU for processing.

In this way, the capability of the port to forward received MPCP packets to the CPU for processing is disabled, and MPCP packets are no longer received.

Step 705b: Disable a capability to send MPCP packets.

It should be noted that performing Step 705b prevents the first Ethernet device from actively sending MPCP packets for access registration probing of an ONU device.

Step 706b: Disable a Force link up state of the port.

At this time, the port is in a Link down state, unable to actively send packets, unable to receive packets, and does not have a capability to respond to packets.

Step 707b: Enable an auto-negotiation capability.

It should be noted that performing Step 706b allows the port to enter a signal detection state, and only after receiving a normal auto-negotiation signal may the communication state of the port be switched to a Link up state to send and receive packets.

Based on the above method steps, all ports of Ethernet devices in an Ethernet networking may flexibly switch between the PON mode and the Ethernet mode based on the inserted optical module, achieving convergence of a PON network and an Ethernet network on the same device, reducing the difficulty and workload of management and maintenance, improving the flexibility of device usage, and protecting the investment in networking devices.

In summary, in the port mode switching method provided by the present application, when determining that a target port mode corresponding to a module type of an inserted optical module is different from a current port mode, the port is switched from the current port mode to the target port mode according to a port mode switching manner set corresponding to the module type. In this way, the port mode of an Ethernet device may flexibly and automatically switch between multiple port modes (such as the PON mode and the Ethernet mode), addressing the issue in PON and Ethernet convergence solutions that requires managing two different types of networking devices, making the integrated network easier to maintain. Moreover, due to the free switching between multiple port modes, a single network device port may be used in the integrated PON and Ethernet network to meet user network demands for both PON and Ethernet through networking devices, further reducing the network complexity and the maintenance and management difficulty of the integrated network.

In addition, this approach, due to the free/automatic switching of a port of a networking device between two port modes, provides a simpler and more user-friendly networking method for convergence based on PON and Ethernet, making network deployment more flexible, and the investment in networking devices more scalable and flexible, effectively protecting the investment in networking devices.

Figure 8:
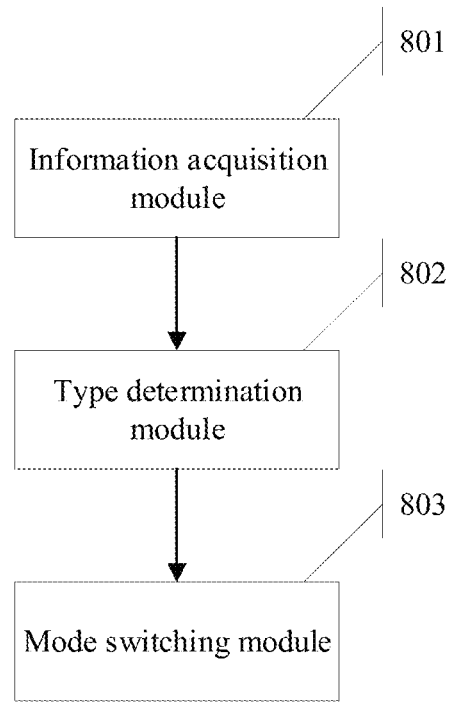
FIG. 8 is a schematic structural diagram of a port mode switching apparatus provided by an embodiment of the present application.

Further, based on the same technical concept, an embodiment of the present application provides a port mode switching apparatus applied to any one Ethernet device in an Ethernet networking, the port mode switching apparatus being configured to implement the above method process of the embodiments of the present application. Referring to FIG. 8, the port mode switching apparatus includes: an information acquisition module 801, a type determination module 802, and a mode switching module 803, where:

the information acquisition module 801 is configured to, responding to an operation of inserting an optical module into a port, acquire characteristic information of the optical module;

the type determination module 802 is configured to determine a module type of the optical module based on characteristic intervals to which a plurality of optical module characteristics included in the characteristic information respectively belong;

the mode switching module 803 is configured to, when determining that a target port mode corresponding to the module type is different from a current port mode, switch the port from the current port mode to the target port mode according to a port mode switching manner set corresponding to the module type.

In an optional embodiment, if the following conditions are met, determining that the target port mode corresponding to the module type is different from the current port mode:

the target port mode is the passive optical network PON mode, and the current port mode is the Ethernet mode; or, the target port mode is the Ethernet mode, and the current port mode is the PON mode.

In an optional embodiment, when switching the port from the current port mode to the target port mode according to the port mode switching manner set corresponding to the module type, the mode switching module 803 is specifically configured to:

if the module type is the PON type, switch the port from the Ethernet mode to the PON mode according to a port switching mode set corresponding to the PON type; and if the module type is the Ethernet type, switch the port from the PON mode to the Ethernet mode according to a port switching mode set corresponding to the Ethernet type.

In an optional embodiment, when switching the port from the Ethernet mode to the PON mode according to the port switching mode set corresponding to the PON type, the mode switching module 803 is specifically configured to:

disable an auto-negotiation capability of the port, and switch a communication state of the port to a forced connected state; where the forced connected state indicates: the port has a capability to actively send packets; and enable a capability of the port to forward multipoint control protocol MPCP packets to a central processing unit CPU.

In an optional embodiment, after enabling the capability of the port to forward multipoint control protocol MPCP packets to the central processing unit CPU, the mode switching module 803 is further configured to:

enable a capability of the port to send MPCP packets, and send an access probe request for an integrated network; where the integrated network has a PON service capability and an Ethernet service capability;

receive access registration responses respectively returned by a plurality of to-be-accessed network devices based on the access probe request; and if there exists an access registration response indicating a need to access the integrated network among the plurality of access registration responses, perform access registration for the integrated network for the to-be-accessed network device corresponding to the access registration response.

In an optional embodiment, when switching the port from the PON mode to the Ethernet mode according to the port switching mode set corresponding to the Ethernet type, the mode switching module 803 is specifically configured to:

disable a capability of the port to receive MPCP packets;
disable a capability of the port to send MPCP packets; and
switch the communication state of the port from the forced connected state to a disconnected state.

In an optional embodiment, when disabling the capability of the port to receive MPCP packets, the mode switching module 803 is further configured to:

disable a capability of the port to upload MPCP packets to the CPU.

In an optional embodiment, after switching the communication state of the port from the forced connected state to the disconnected state, the mode switching module 803 is further configured to:

enable an auto-negotiation capability of the port, and when determining that the port receives an auto-negotiation signal, switch the communication state of the port from the disconnected state to a connected state; where the connected state indicates: the port has a capability to respond to packets but does not have a capability to actively send packets.

Figure 9:
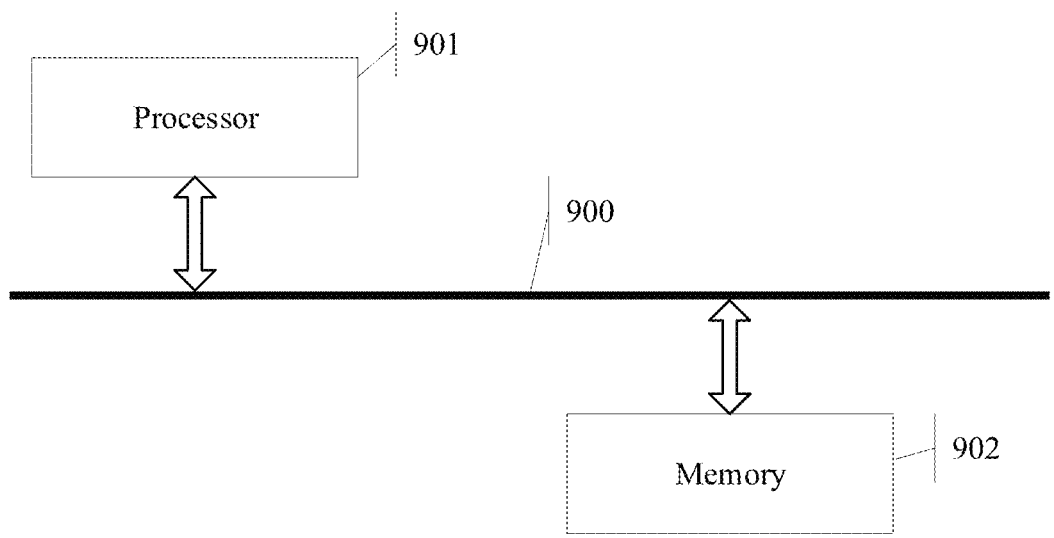
FIG. 9 is a schematic structural diagram of an electronic device provided by an embodiment of the present application.

Based on the same technical concept, an embodiment of the present application further provides an electronic device capable of implementing the port mode switching method process provided by the above embodiments of the present application. In one embodiment, the electronic device may be a server, a terminal device, or other electronic devices. Referring to FIG. 9, the electronic device may include:

at least one processor 901, and a memory 902 connected to the at least one processor 901. The embodiments of the present application do not limit the specific connection medium between the processor 901 and the memory 902. In FIG. 9, the processor 901 and the memory 902 are connected through a bus 900 as an example. The bus 900 is represented by a thick line in FIG. 9, and the connection manner between other components is only for illustrative purposes and is not limited thereto. The bus 900 may be divided into an address bus, a data bus, a control bus, and the like. For ease of representation, only one thick line is used in FIG. 9, but it does not mean that there is only one bus or one type of bus. Alternatively, the processor 901 may also be referred to as a controller, and the name is not limited.

In the embodiments of the present application, the memory 902 stores instructions executable by the at least one processor 901, and the at least one processor 901 may perform the port mode switching method discussed above by executing the instructions stored in the memory 902. The processor 901 may implement the functions of each module in the apparatus shown in FIG. 8.

The processor 901 is a control center of the apparatus, may connect various parts of the entire control device using various interfaces and lines, and perform various functions and process data of the apparatus by running or executing instructions stored in the memory 902 and invoking data stored in the memory 902, thereby performing overall monitoring of the apparatus.

In a possible design, the processor 901 may include one or more processing units, and the processor 901 may integrate an application processor and a modem processor, where the application processor mainly handles an operating system, a user interface, and applications, and the modem processor mainly handles wireless communications. It can be understood that the modem processor may not be integrated into the processor 901. In some embodiments, the processor 901 and the memory 902 may be implemented on the same chip, and in some embodiments, they may also be implemented separately on independent chips.

The processor 901 may be a general-purpose processor, such as a CPU, a digital signal processor, an application-specific integrated circuit, a field-programmable gate array or other programmable logic devices, discrete gate or transistor logic devices, or discrete hardware components, capable of implementing or performing the methods, steps, and logic block diagrams disclosed in the embodiments of the present application. The general-purpose processor may be a microprocessor or any one conventional processor, and the like. The steps of the port mode switching method disclosed in the embodiments of the present application may be directly embodied as being performed by a hardware processor or performed by a combination of hardware and software modules in a processor.

The memory 902, as a non-volatile computer-readable storage medium, may be used to store non-volatile software programs, non-volatile computer-executable programs, and modules. The memory 902 may include at least one type of storage medium, for example, may include a flash memory, a hard disk, a multimedia card, a card-type memory, a random access memory (Random Access Memory, RAM), a static random access memory (Static Random Access Memory, SRAM), a programmable read-only memory (Programmable Read Only Memory, PROM), a read only memory (Read Only Memory, ROM), an electrically erasable programmable read only memory (Electrically Erasable Programmable Read-Only Memory, EEPROM), a magnetic memory, a magnetic disk, an optical disk, and the like. The memory 902 is any other medium capable of carrying or storing desired program code in the form of instructions or data structures and capable of being accessed by a computer, but is not limited thereto. The memory 902 in the embodiments of the present application may also be a circuit or any other device capable of implementing a storage function, used to store program instructions and/or data.

By designing and programming the processor 901, the code corresponding to the port mode switching method introduced in the foregoing embodiments may be solidified into a chip, so that the chip may perform the steps of the port mode switching method of the embodiment shown in FIG. 4 during operation. How to design and program the processor 901 is a technique well known to those skilled in the art and will not be repeated here.

Based on the same inventive concept, an embodiment of the present application further provides a communication system including: an Ethernet device and a first to-be-accessed network device; where the Ethernet device is configured to, responding to an operation of inserting an optical module into a port, acquire characteristic information of the optical module, determine a module type of the optical module based on characteristic intervals to which a plurality of optical module characteristics included in the characteristic information respectively belong, and when determining that a target port mode corresponding to the module type is different from a current port mode, switch the port from the current port mode to the target port mode according to a port mode switching manner set corresponding to the module type, and send an access probe request for an integrated network to the first to-be-accessed network device; where the integrated network has a PON service capability and an Ethernet service capability;

the first to-be-accessed network device is configured to receive the access probe request, and when determining that the target port mode is a PON mode, return an access registration response to the Ethernet device based on the access probe request; where the access registration response indicates whether the first to-be-accessed network device needs to access the integrated network.

Based on the same inventive concept, an embodiment of the present application further provides a communication system including: an Ethernet device and a second to-be-accessed network device; where the Ethernet device is configured to, responding to an operation of inserting an optical module into a port, acquire characteristic information of the optical module, determine a module type of the optical module based on characteristic intervals to which a plurality of optical module characteristics included in the characteristic information respectively belong, and when determining that a target port mode corresponding to the module type is different from a current port mode, switch the port from the current port mode to the target port mode according to a port mode switching manner set corresponding to the module type, and send an access probe request for an integrated network to the second to-be-accessed network device; where the integrated network has a PON service capability and an Ethernet service capability; and the second to-be-accessed network device is configured to receive the access probe request, and when determining that the target port mode is an Ethernet mode, return an access registration response to the Ethernet device based on the access probe request; where the access registration response indicates whether the second to-be-accessed network device needs to access the integrated network.

Based on the same inventive concept, an embodiment of the present application further provides a communication system including: an Ethernet device and a third to-be-accessed network device; where
- the Ethernet device is configured to, responding to an operation of inserting an optical module into a port, acquire characteristic information of the optical module, determine a module type of the optical module based on characteristic intervals to which a plurality of optical module characteristics included in the characteristic information respectively belong, and when determining that a target port mode corresponding to the module type is different from a current port mode, switch the port from the current port mode to the target port mode according to a port mode switching manner set corresponding to the module type, and send an access probe request for an integrated network to the third to-be-accessed network device; where the integrated network has a PON service capability and an Ethernet service capability; and
- the third to-be-accessed network device is configured to receive the access probe request, and when determining that the target port mode is an Ethernet mode or a PON mode and the target port mode is the same as a device port mode of the third to-be-accessed network device, return an access registration response to the Ethernet device based on the access probe request; or, when determining that the target port mode is the Ethernet mode or the PON mode and the target port mode is different from the device port mode of the third to-be-accessed network device, switch the device port mode to the target port mode, and after switching the device port mode to the target port mode, return an access registration response to the Ethernet device based on the access probe request; where the access registration response indicates whether the third to-be-accessed network device needs to access the integrated network.

Based on the same inventive concept, an embodiment of the present application further provides a storage medium storing computer instructions, where when the computer instructions run on a computer, the computer performs the port mode switching method discussed above.

In some possible implementations, various aspects of the port mode switching method provided by the present application may also be implemented in the form of a program product, which includes program code. When the program product runs on a device, the program code is configured to cause the control device to perform the steps in the port mode switching method according to various exemplary embodiments of the present application described above in this specification.

It should be noted that although several units or sub-units of the apparatus are mentioned in the above detailed description, such division is merely exemplary and not mandatory. In fact, according to the embodiments of the present application, the features and functions of two or more units described above may be embodied in one unit. Conversely, the features and functions of one unit described above may be further divided to be embodied by multiple units.

In addition, although the operations of the method of the present application are described in a specific order in the drawings, this does not require or imply that these operations must be performed in the specific order, or that all shown operations must be performed to achieve the desired results. Additionally or alternatively, some steps may be omitted, multiple steps may be combined into one step for execution, and/or one step may be decomposed into multiple steps for execution.

Those skilled in the art should understand that the embodiments of the present application may be provided as a method, a system, or a computer program product. Therefore, the present application may take the form of an entirely hardware embodiment, an entirely software embodiment, or an embodiment combining software and hardware aspects. Moreover, the present application may take the form of a computer program product implemented on one or more computer-usable storage media (including but not limited to disk storage, CD-ROM, optical storage, and the like) containing computer-usable program code.

The present application is described with reference to flowcharts and/or block diagrams of methods, devices (systems), and computer program products according to the embodiments of the present application. It should be understood that each process and/or block in the flowcharts and/or block diagrams, and combinations of processes and/or blocks in the flowcharts and/or block diagrams, may be implemented by computer program instructions. These computer program instructions may be provided to a processor of a general-purpose computer, a special-purpose computer, an embedded processor, or other programmable data processing devices to produce a server, so that the instructions executed by the processor of the computer or other programmable data processing devices produce a device for implementing the functions specified in one or more processes in the flowcharts and/or one or more blocks in the block diagrams.

The program code for performing the operations of the present application may be written in any combination of one or more programming languages, including object-oriented programming languages, such as Java, C++, and the like, and conventional procedural programming languages, such as the "C" language or similar programming languages. The program code may be executed entirely on a user computing device, partly on a user device, as a standalone software package, partly on a user computing device and partly on a remote computing device, or entirely on a remote computing device or server.

These computer program instructions may also be loaded onto a computer or other programmable data processing device, so that a series of operational steps are performed on the computer or other programmable device to produce a computer-implemented process, thereby providing steps for implementing the functions specified in one or more processes in the flowcharts and/or one or more blocks in the block diagrams through the instructions executed on the computer or other programmable device.

Obviously, those skilled in the art may make various changes and modifications to the present application without departing from the spirit and scope of the present application. Thus, if these modifications and variations of the present application fall within the scope of the claims of the present application and their equivalent technologies, the present application is also intended to include these changes and variations.

The invention claimed is:

1. A port mode switching method, applied to an Ethernet device in an Ethernet networking, comprising:
   responding to an operation of inserting an optical module into a port, acquiring characteristic information of the optical module, wherein the characteristic information comprises a plurality of optical module characteristics, wherein the plurality of optical module characteristics comprise an interface characteristic;
   determining an interface type corresponding to the optical module based on the interface characteristic;

determining a module type of the optical module based on the interface type; and when determining that a target port mode corresponding to the module type is different from a current port mode of the port, switching the port from the current port mode to the target port mode according to a port mode switching manner set corresponding to the module type;

wherein the port mode comprises a passive optical network (PON) mode and an Ethernet mode.

2. The port mode switching method according to claim 1, wherein the plurality of optical module characteristics further comprises a wavelength characteristic.

3. The method according to claim 2, before the determining the module type of the optical module based on the interface type, the method further comprises:

determining, by the Ethernet device, a wavelength type corresponding to the optical module based on the acquired wavelength characteristic; and the determining the module type of the optical module based on the interface type comprises: determining the module type of the optical module based on the wavelength type and the interface type.

4. The port mode switching method according to claim 2, wherein determining the module type of the optical module based on the interface characteristic comprises:

determining, by the Ethernet device, a wavelength characteristic interval to which the wavelength characteristic belongs, and an interface characteristic interval to which the interface characteristic belongs; and determining, by the Ethernet device, the module type of the optical module based on the wavelength characteristic interval and the interface characteristic interval.

5. The port mode switching method according to claim 4, wherein the Ethernet device determining the module type of the optical module based on the wavelength characteristic interval and the interface characteristic interval comprises:

determining, by the Ethernet device, a wavelength type and the interface type corresponding to the optical module based on the wavelength characteristic interval and the interface characteristic interval; and determining the module type of the optical module based on the wavelength type and the interface type.

6. The port mode switching method according to claim 1, wherein the Ethernet device acquires the characteristic information based on data acquisition devices respectively set corresponding to the plurality of optical module characteristics.

7. The port mode switching method according to claim 1, wherein when a following condition is met, determining that the target port mode corresponding to the module type is different from the current port mode:

the target port mode is the PON mode, and the current port mode is the Ethernet mode; or the target port mode is the Ethernet mode, and the current port mode is the PON mode.

8. The port mode switching method according to claim 1, wherein the module type comprises a passive optical network (PON) type and an Ethernet network type.

9. The port mode switching method according to claim 8, wherein switching the port from the current port mode to the target port mode according to the port mode switching manner set corresponding to the module type comprises:

when the module type is the PON type, switching the port from the Ethernet mode to the PON mode according to a port switching mode set corresponding to the PON type; and/or when the module type is the Ethernet network type, switching the port from the PON mode to the Ethernet mode according to the port switching mode set corresponding to the Ethernet network type.

10. The port mode switching method according to claim 9, wherein switching the port from the Ethernet mode to the PON mode according to the port switching mode set corresponding to the PON type comprises:

disabling an auto-negotiation capability of the port, and switching a communication state of the port to a forced connected state; wherein the forced connected state represents that the port has a capability to actively send packets; and enabling a capability of the port to forward multipoint control protocol (MPCP) packets to a central processing unit (CPU).

11. The port mode switching method according to claim 10, wherein after enabling the capability of the port to forward the multipoint control protocol (MPCP) packets to the central processing unit (CPU), the port mode switching method further comprises:

enabling a capability of the port to send MPCP packets, and sending an access probe request for an integrated network; wherein the integrated network has a PON service capability and an Ethernet service capability;

receiving access registration responses respectively returned by a plurality of to-be-accessed network devices based on the access probe request; and when there exists an access registration response indicating a need to access the integrated network among the access registration responses, performing access registration for the integrated network for a to-be-accessed network device corresponding to the access registration response.

12. The port mode switching method according to claim 9, wherein switching the port from the PON mode to the Ethernet mode according to the port switching mode set corresponding to the Ethernet network type comprises:

disabling a capability of the port to receive MPCP packets;

disabling a capability of the port to send MPCP packets; and switching a communication state of the port from a forced connected state to a disconnected state.

13. The port mode switching method according to claim 12, wherein disabling the capability of the port to receive the MPCP packets further comprises:

disabling a capability of the port to upload the MPCP packets to a CPU.

14. The port mode switching method according to claim 12, wherein after switching the communication state of the port from the forced connected state to the disconnected state, the port mode switching method further comprises:

enabling an auto-negotiation capability of the port, and when determining that the port receives an auto-negotiation signal, switching the communication state of the port from the disconnected state to a connected state; wherein the connected state represents that the port has a capability to respond to packets and does not have a capability to actively send the packets.

15. An electronic device comprising a memory, a processor, and a computer program stored on the memory and executable on the processor, wherein the processor, when executing the computer program, implements the port mode switching method according to claim 1.

16. A computer-readable storage medium having a computer program stored thereon, wherein the computer program, when executed by a processor, implements the steps of the port mode switching method according to claim 1.

17. A port mode switching method, applied to an Ethernet device in an Ethernet networking, comprising:
- responding to an operation of inserting an optical module into a port, acquiring characteristic information of the optical module, wherein the characteristic information comprises a plurality of optical module characteristics, the plurality of optical module characteristics comprise a wavelength characteristic and an interface characteristic;
- determining a module type of the optical module based on the plurality of optical module characteristics; and
- when determining that a target port mode corresponding to the module type is different from a current port mode of the port, switching the port from the current port mode to the target port mode according to a port mode switching manner set corresponding to the module type;
- wherein the port mode comprises a passive optical network PON mode and/or an Ethernet mode; and
- wherein the determining a module type of the optical module based on the plurality of optical module characteristics comprises:
- determining, by the Ethernet device, a wavelength type corresponding to the optical module based on the acquired wavelength characteristic, and determining an interface type corresponding to the optical module based on the acquired interface characteristic; and determining the module type of the optical module based on the wavelength type and the interface type.

* * * * *